(12) United States Patent
Nobles

(10) Patent No.: US 10,526,246 B2
(45) Date of Patent: Jan. 7, 2020

(54) CONCRETE COMPOSITIONS AND METHODS FOR MAKING THEREOF

(71) Applicant: Above Grade Environmental, LLC, Joliet, IL (US)

(72) Inventor: James Todd Nobles, Joliet, IL (US)

(73) Assignee: Above Grade Environmental, LLC, Joliet, IL (US)

( * ) Notice: Subject to any disclaimer, the term of this patent is extended or adjusted under 35 U.S.C. 154(b) by 112 days.

(21) Appl. No.: 15/812,506

(22) Filed: Nov. 14, 2017

(65) Prior Publication Data

US 2018/0141861 A1 May 24, 2018

Related U.S. Application Data

(60) Provisional application No. 62/424,198, filed on Nov. 18, 2016.

(51) Int. Cl.
*C04B 16/04* (2006.01)
*C04B 7/02* (2006.01)
*C04B 28/04* (2006.01)
*C04B 111/00* (2006.01)

(52) U.S. Cl.
CPC ............... *C04B 16/04* (2013.01); *C04B 7/02* (2013.01); *C04B 28/04* (2013.01); *C04B 2111/00017* (2013.01); *C04B 2111/00025* (2013.01); *C04B 2290/20* (2013.01); *Y02W 30/92* (2015.05); *Y02W 30/96* (2015.05)

(58) Field of Classification Search
None
See application file for complete search history.

(56) References Cited

U.S. PATENT DOCUMENTS

| | | | | |
|---|---|---|---|---|
| 3,437,489 A | * | 4/1969 | Arakawa | A23K 10/22 426/541 |
| 3,867,159 A | * | 2/1975 | Ergene | C04B 28/02 106/646 |
| 4,036,656 A | * | 7/1977 | Bucco | C04B 28/30 106/18.12 |
| 4,122,208 A | * | 10/1978 | Tronstad | A23B 4/031 34/386 |
| 4,836,855 A | * | 6/1989 | Caillau | C04B 24/14 106/655 |
| 4,961,636 A | * | 10/1990 | Gaul | G02B 7/16 359/381 |
| 4,976,973 A | * | 12/1990 | Shirakawa | A23J 1/04 426/480 |
| 5,972,403 A | * | 10/1999 | Tiller | A23J 1/002 426/467 |
| 9,765,112 B2 | * | 9/2017 | Olivier | A23J 1/006 |

FOREIGN PATENT DOCUMENTS

CN 106082825 A * 11/2016
JP 53127189 A * 11/1978

* cited by examiner

*Primary Examiner* — Anthony J Green
(74) *Attorney, Agent, or Firm* — Richards Patent Law P.C.

(57) ABSTRACT

The present concrete composition uses Asian carp fishmeal (the burned remains of the carp) as an admixture. The core principle behind the development of present concrete composition stems from attempting to find a beneficial use for a waste product in a civil engineering application. The incorporation of the fishmeal improves the cementitious properties when added to a concrete mix. Thus, the fishmeal concrete composition incentivizes the harvesting of Asian carp and the production of fishmeal.

9 Claims, 12 Drawing Sheets

|  | Structural | Non-Structural | Strength Required (PSI @ 14 Days) | Fish Filler (%) |
|---|---|---|---|---|
| Residential Interior Columns | X |  | 2500-3000 | .5, 1, 2 & 5 |
| Shallow Foundations | X |  | 3500 | .5, 1, 2 & 5 |
| Drilled Shafts/Piles | X |  | 4000 | .5 & 5 |
| Pavement |  | X | 3500 | .5, 1, 2 & 5 |
| Bridge Superstructure | X |  | 4000 | .5 & 5 |
| Curbs/Sidewalks |  | X | 3500 | .5, 1, 2 & 5 |
| Seal Coat |  | X | 3500 | .5, 1, 2 & 5 |
| Railroad Crossing |  | X | 3500 (48 hrs.) | None |
| Bridge Deck Patching |  | X | 3200 | .5, 1, 2 & 5 |
| Dams | X |  | 3500 | .5, 1, 2 & 5 |
| Bridge Decks | X |  | 4000 (48 hrs.) | None |

FIG. 12

CONCRETE COMPOSITIONS AND METHODS FOR MAKING THEREOF

CROSS-REFERENCE TO RELATED APPLICATIONS

This application incorporates by reference and claims the benefit of priority to U.S. Provisional Application 62/424,198 filed on Nov. 18, 2016.

BACKGROUND OF THE INVENTION

The present subject matter relates generally to concrete compositions and methods of making thereof.

Asian carp are an invasive fish species which are rapidly multiplying and over-running the ecosystems of native fish. "Asian carp" is a common all-encompassing term for species of silver, bighead and black carp originating from Asia which are found in American river systems. Specifically, "Asian carp" can refer to herring, grass carp, bighead carp, silver carp, and other carp fishes collectively. Introduced in the 1970's to filter pond water, the Asian carp escaped into the waterways of the Mississippi River Basin and have exploded in population dominating every ecosystem they populate. The Asian carp rapidly multiply, easily reaching weights in excess of 100 pounds, and thus far have proven to be impossible to eradicate. As an invasive species, they have no natural predators and effectively out compete native fish for food and habitat. In some waterways, Asian carp represent over 90% of the total biomass of the ecosystem. To date they have been confined to the Mississippi River Basin, having a substantial effect on the commercial fishing industry.

The current concern with respect to the Asian carp includes their northward propagation. The Great Lakes Basin is directly connected to the Mississippi River Basin via the Chicago Area Waterways System, which is a series of shipping and sewage canals. Currently, the U.S. Army Corps of Engineers maintains electric barriers in an attempt to deny Asian carp access to the Great Lakes Basin. Such efforts have been mostly effective, but not an absolute deterrent.

Despite the effectiveness of the barriers, there are additional ways the fish could reach the Great Lakes Basin. For example, flooding of certain adjacent waterways and human transplantation are both reasonable means of introduction. If the fish reach the Great Lakes Basin and establish resident populations, which currently seems likely, the Asian carp has the potential to decimate the local fish species. The Great Lakes sport and fishing industries are valued at over $4.5 billion dollars annually. Introduction of Asian carp would have a devastating impact on communities that are reliant upon these industries as well. There is a clear need to deter, and if possible, remove these fish from American waterways.

Fishing efforts thus far have not yet been able to make a dent into the sheer number of Asian carp that have recently caused a stir at the rate they have been able to overtake and dominate the biomass in the Midwest waterways. Currently, fisherman are able to sell their catch to a fish meal processors for an average of 12.5 cents per pound. At 12.5 cents per pound there is no real incentive in catching the invasive species. There needs to be a greater incentive (price per pound) that must exist, before a full-on assault on the invasive species can take place.

In 2011, a hydro-acoustic survey conducted in Illinois put the Asian carp fish population totals in the Illinois River at 2800 per river mile which equates to approximately 4666 pounds per river mile of the species. With the female fish capable of producing over 1 million eggs per year these numbers are only going to continue to rise until a saturation point is reached and move on to bigger bodies of water such as the Great lakes. There is no data available to put a number on the total Asian carp population that has successfully and rapidly established themselves across the heartland.

In efforts to reduce the sheer number of Asian carp that are overtaking the Illinois River a pilot program was initiated with restricted participation from local fisherman. The local fisherman were successful in netting over two hundred thousand pounds of the species in the fall of 2011. The annual production of Asian carp in the Illinois River alone could far surpass three millions pounds and accounting for all the back channels and tributaries could be as high as 10 million pounds of the species. A section of the Illinois River 157.7 miles long from the Peoria Lock and Dam to the Mississippi River has an estimated 3.1 million pounds alone, which is a mere blip on the global production scale of Asian carp which is over 7 billion pounds.

The fishing industry and towns located along the Illinois River could see a significant economic growth with the estimated annual volume of Asian carp that could be harvested. If just the Illinois River can produce 10 million pounds annually of the species and with a 28% return per pound of fish to fish meal, a total of 2.8 million pounds of fish meal could be produced and blended in with the production of concrete.

Many industries and jobs associated with the Great Lakes are already feeling the impact of the invasive species, that isn't yet reported to be in the Great Lakes. One area of concern for the fish to enter the Great Lakes is the Chicago Sanitary and Ship Canal. This particular canal accounts for 7 million tons of cargo needing to be transported through the Chicago area water ways, contributes to 1.5 billion dollars to Chicago's local economy and employs thousands of individuals. The Great Lakes regional fishing industry employs 58,000 individuals while the recreational industry adds a staggering 16 billion dollars to the economy and 246,000 jobs. With the economy as a whole recovering from a recent recession, reducing the impact on the economy due to the Asian carp species is a pressing issue.

In 2010, the Obama Administration outlined steps to be implemented immediately in a summit meeting to combat the Asian carp species from entering the Great Lakes through the Chicago Sanitary and Ship Canals. A third electric barrier is considered to being constructed at a price tag of $10 million dollars. The first two electric barriers cost $23 million dollars to be constructed and have an annual operating cost over $7 million. Another electric barrier located in the Des Plains River costs $13 million dollars. And probably the most controversial step to come out of the summit was the closing of the Chicago Sanitary and Ship Canal three days a week. The closures of the locks associated with access into the Great Lakes through the Chicago Area Waterway System (CAWS) are estimated to cost over $4 billion dollars over the next 20 years, hindering Chicago's local economy.

In 2010, the Army Corp of Engineers undertook a study called the Great Lakes and Mississippi River Interbasin Study, GLMRIS. GLMRIS was formed to analyze the potential way to reduce or prevent an invasive species from entering the Great Lakes. At the end of the study, GLMRIS identified several options or ways to deal with topic from taking no further action (meaning what is in place already is suffice) to spending $18 billion dollars. Table 1 details the options outlined at the conclusion of the GLMRIS.

TABLE 1

($ in billions)

| Alternative | Name/Description | Cost ($-b) | Completion time |
|---|---|---|---|
| 1 | No New Action | — | — |
| 2 | Non-Structural Control Technologies | $ 0.07 | immediate |
| 3 | Mid-System Control Technologies with No Buffe Zone | $15.50 | 25 years |
| 4 | Control Technologies with a Buffer Zone | $ 7.80 | 10 years |
| 5 | Lakefront Hydrologic Seperation | $18.40 | 25 years |
| 6 | Mid-System Hydrologic Seperation | $15.50 | 25 years |
| 7 | Mid-System Seperation Cal-Sag Open | $15.10 | 25 years |
| 8 | Mid-System Seperation CSSC open | $ 8.30 | 25 years |

(Source: Great Lakes and Mississippi River Interbasin Study, 2013.)

The U.S. Fish and Wildlife Service is another agency that provides assistance in the efforts to stop the advancement of the Asian carp. The U.S. Fish and Wildlife Service is providing funding to implement interstate strategies to limit the impact thus far due to the invasive species of Asian carp. The U.S. Fish and Wildlife Service also leads the efforts in the development of a National Management and Control Plan for the Asian carp. The Control Plan is intended to be a blueprint for interagency activities to prevent, manage, and control the Asian carp.

The Illinois Department of Natural Resources (IDNR) has also launched their own efforts to study the effects of the invasive species. After a two year comprehensive study, the IDNR has verified an adult population presence as close as 47 miles from Lake Michigan and active spawning of the species 67 miles from the lake. 1.4 million pounds of the invasive species was successfully removed during the IDNR's research project in the CAWS. Over fears the invasive species has successfully made it passed the installed preventative measures, a section of the CAWS was intentionally laced with poison (at a cost of $3 million dollars per mile) to gather information whether or not the species has migrated into the Great Lakes through the CAWS. One single Asian carp was found and took on the name of the "Three million dollar fish".

The Mississippi River stretches 2320 miles, from the southern portion of Louisiana all the way north into Minnesota. Along the entire stretch of 2320 miles of the Mississippi River system, the Asian carp can be located. Which means the ten bordering states that the Mississippi River divides, are all having to deal with how to manage the species and litigate the damage being done. With a total of 17 states having reported the Asian carp invasive species has been found thriving in their rivers and local tributaries. Fifteen years ago only 7 states were known to have the species successfully spawning. The Asian carp species have used the Mississippi, Ohio, and the Missouri Rivers as a highway system that has access to every state east of the Rockies, even Canada. Other states departmental agencies have also launched similar efforts to study the ecological, environmental, and economic impact due to invasive Asian carp species. Only areas pertaining to the CAWS and Illinois agencies involved in the efforts to manage and control the fish was collected and used in this research project. Other state's research and data was not included into this report.

Accordingly, there is a need for creating a market for Asian carp fish to increase the consumption of such fish in order to reduce the population of the Asian carp, thereby protecting the natural ecosystems of which they reside. There is a need for systems and methods that use the Asian carp in industrial processes for creating environmentally friendly products.

BRIEF SUMMARY OF THE INVENTION

The present disclosure provides concrete compositions and methods of making thereof. Various examples of the compositions and methods are provided herein.

A concrete composition comprising a cement composition including cement, at least one aggregate, and water; and a fishmeal composition.

A method of making a concrete composition, the method comprising grinding a fish product; mixing the ground fish products with an oil absorbing material to form a mixed material; drying the mixed material in a dryer to form a dried material; separating the dried material in a cyclone including an airstream to form a separated dried material; pressing the separated dried material to form a fishmeal composition; forming a cement composition including cement, at least one aggregate, a filler, and water; and mixing the fishmeal composition and cement composition to form a concrete composition.

An advantage of the present methods and compositions is making use of Asian carp fishmeal (the burned remains of the fish), thereby increasing the demand for fishing for Asian carp, and ultimately lowering the population of Asian carp for the benefit of the natural ecosystem.

An advantage of the present system is the removal of the carcinogens conventionally used in the production of concrete.

A further advantage of the present system is a concrete composition that prevents buckling due to extreme heat.

Another advantage of the present composition is a reduced number of freeze-thaw cycles compared to conventional concrete compositions.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 12 is a chart describing various functionalities of the compositions.

DETAILED DESCRIPTION OF THE INVENTION

The present fishmeal concrete compositions are suitable for concrete applications where the ultimate compressive strength requirements are at or less than 4500 psi without the use of a catalyst to promote a more defined protein chain. The present concrete compositions can be used for dams, shallow foundations, roads, bridge decks as well as some other similar applications.

The present concrete composition uses Asian carp fishmeal (the burned remains of the carp) as an admixture. The core principle behind the development of present concrete composition stems from attempting to find a beneficial use for a waste product in a civil engineering application. The incorporation of the fishmeal improves the cementitious properties when added to a concrete mix. Thus, the fishmeal concrete composition incentivizes the harvesting of Asian carp and the production of fishmeal.

In other words, the present composition incentivizes the fishing of the carp, thereby, creating a market for the Asian carp. Asian carp exist in such great numbers that they are being pulled up anyway, despite the species fishermen are targeting. An increased value for the species would encourage commercial fishermen to actively fish for them.

Due to the aforementioned destruction by Asian carp to ecosystems they invade, it would be ideal to decrease the population of the carp. The present demand for the present composition may restore the ecosystem for native fish species, as well as a boon for the sectors of the commercial fishing industry which target these oppressed species.

The present composition provides an alternative option to conventional admixtures that have proven to be harmful to humans. For example, the conventional use of fly ash may be reduced as a result of the present composition, as fly ash inherently contains heavy metals such as arsenic, lead and mercury. Ingestion of these toxicants can cause cancer, nervous system damage and organ diseases. Toxicity aside, fishmeal as an alternative for cementitious admixtures could play a vital role as suitable replacement during shortages of materials such as fly ash and slag.

Figure 1:
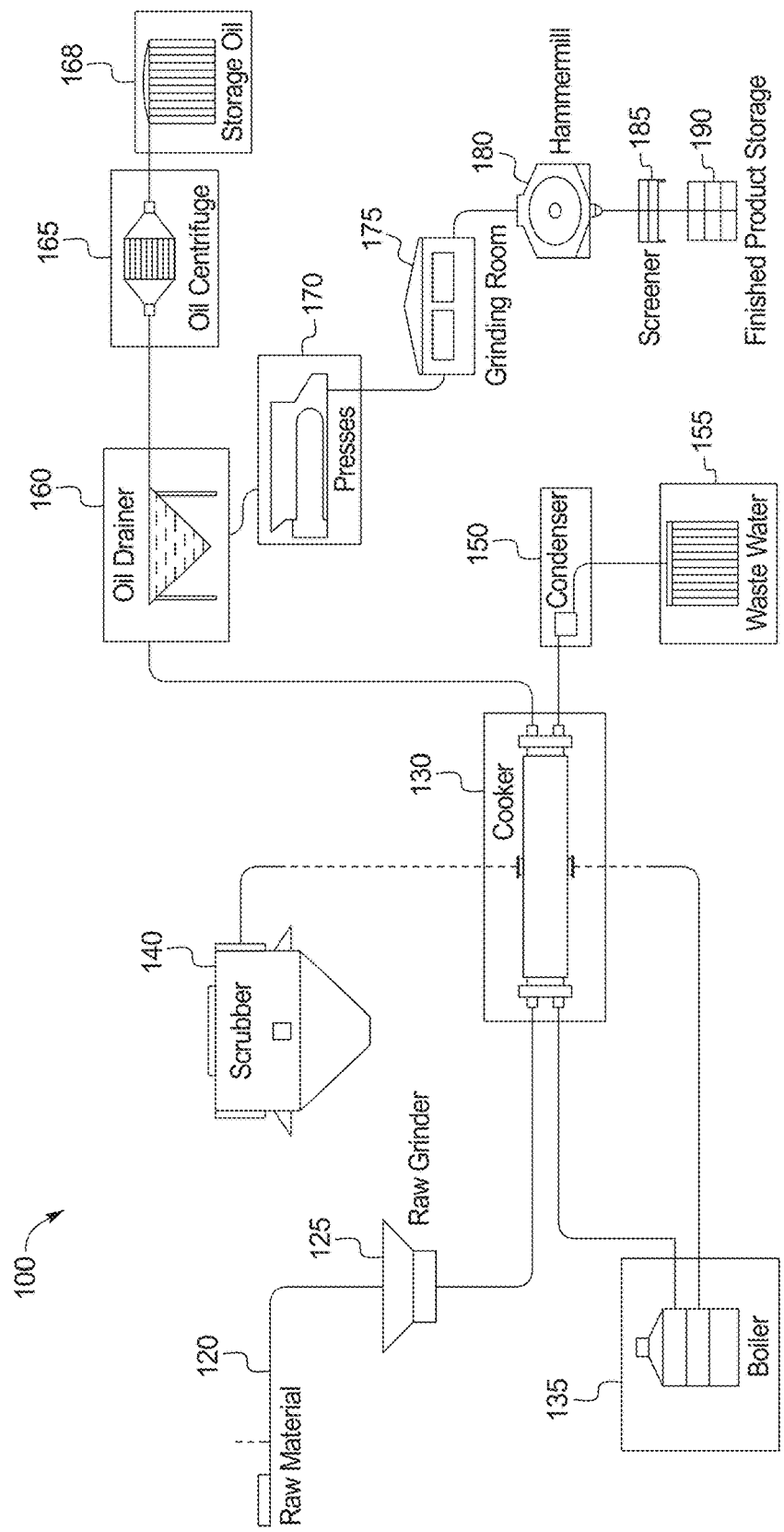
FIG. 1 is a schematic of a conventional system for converting fish into fishmeal.

Fishmeal is a commercial product made from fish, fish bones, and offal from processed fish. Turning the fish into fishmeal by conventional methods uses a boiler to first cook the fish, followed by an oil drainer to reduce the oil of the fish meal to about 6%. The fish oil that is removed from the fishmeal after the cooking process is collected and sold as omega-3 polyunsaturated fatty acids in over-the-counter diet supplement pills. A press is then used to press the material reducing the water content of the fishmeal from 70% down to around 50%. The fishmeal is then dried out before being ground to a fine powdery consistency. The final stage is for the fishmeal to be packaged into usually one ton sacks before being shipped to its destination. The entire process by conventional methods generates about 22% fishmeal and 6% oil return per pound of fish. The final composition of fishmeal by conventional methods on average is 72% in proteins, 8% in oils, 14% ash, and water content of 7%. FIG. 1 shows the process of converting the fish into a fish meal product by conventional methods.

FIG. 1 discloses a conventional apparatus 100 utilized in an animal byproduct rendering process. Raw material to be rendered is received for temporary storage in raw material bins 120. The raw material is then conveyed to a raw material grinder 125 that reduces the raw material to a uniform particle size for material handling and improved heat transfer for cooking. The ground raw material is fed into a cooker 130. The cooker 130 is heated by a boiler 135 generating boiler steam. The boiler brings the raw material to a predetermined and elevated temperature, evaporating moisture and freeing fat from protein and bone. A dehydrated slurry of fat and solids is discharged from the cooker 130 at a controlled rate. The discharged slurry is transported to an oil drainer 160. The drainer 160 separates liquid fat from the solids. The liquid fat is pumped to an oil centrifuge 165, which removes impurities from the fat. The fat is transported to the storage 168 as finished fat. The solids from the drainer 160 go to the presses 170, which reduce the solids' fat content further. Solids discharged from the presses go to a grinding room 175, a hammermill 180, and a screener 185 for further screening and processing of the solids, where they are transported to the storage 190 as a finished product. The water vapor exits the cooker 130 to a condenser 150, which condenses the water vapor. The condensed vapors are eventually discharged as waste water. Odorous gases generated at various points in the rendering process are collected for neutralization and removal by a scrubber 140.

The conventional rendering process shown in FIG. 1 has several disadvantages. For example, the cookers used during the rendering process require expensive odor control equipment such as the scrubbers, condensers, and for waste water storage. These odor-control and odor-causing sources require increased personnel labor, water use, energy consumption, and adequate cooling capacity, in addition to their costs. Conventional methods used during the pressing process collect the water content contained within the fish, which in turn creates a wastewater that now has to be disposed of and treated, not to mention the distinctive "fish" odor that is associated with fish.

In contrast, the present methods eliminate the need to treat the wastewater from the production of the fishmeal, by turning the wastewater into condensation during a drying process. The condensation is then simply released into the atmosphere thus producing not only zero wastewater but also remedies the "fish" odor too.

The present methods result in a reduction in the number of steps and machinery, such as condensers, oil (fat) drainers, and cookers that were previous needed to produce the raw material. With the reduction of equipment needed to produce the fishmeal, fewer workers are then needed to operate and maintain fewer pieces of equipment. Capital costs are also lowered when these newer technologies are implemented into existing processing plants, which in turn are capable of converting a processing plant into an on-site rendering plant as well. This eliminates the need for any extra freight expenses due to shipping the raw material to an off-site rendering plant.

The present methods reduce the water content of the fish meal as a final product. The present technology for the drying process is able to reduce the water content of the raw material from the conventional processing plants which was around 50% down to between 2-25%. With this reduction of water content, during the drying process the waste water is turned into condensation which is then released out into the air.

The process for creating the raw material with the present drying technologies includes a grinder for grinding the whole fish, mixing the ground byproduct materials with an oil absorbing material as well as a back mix material drying the material, pressing the dried material to reduce the oil content from the dried material. Once the material leaves the press, the pressed material is sent to a storage silo for storage as a finished product.

Figure 2:
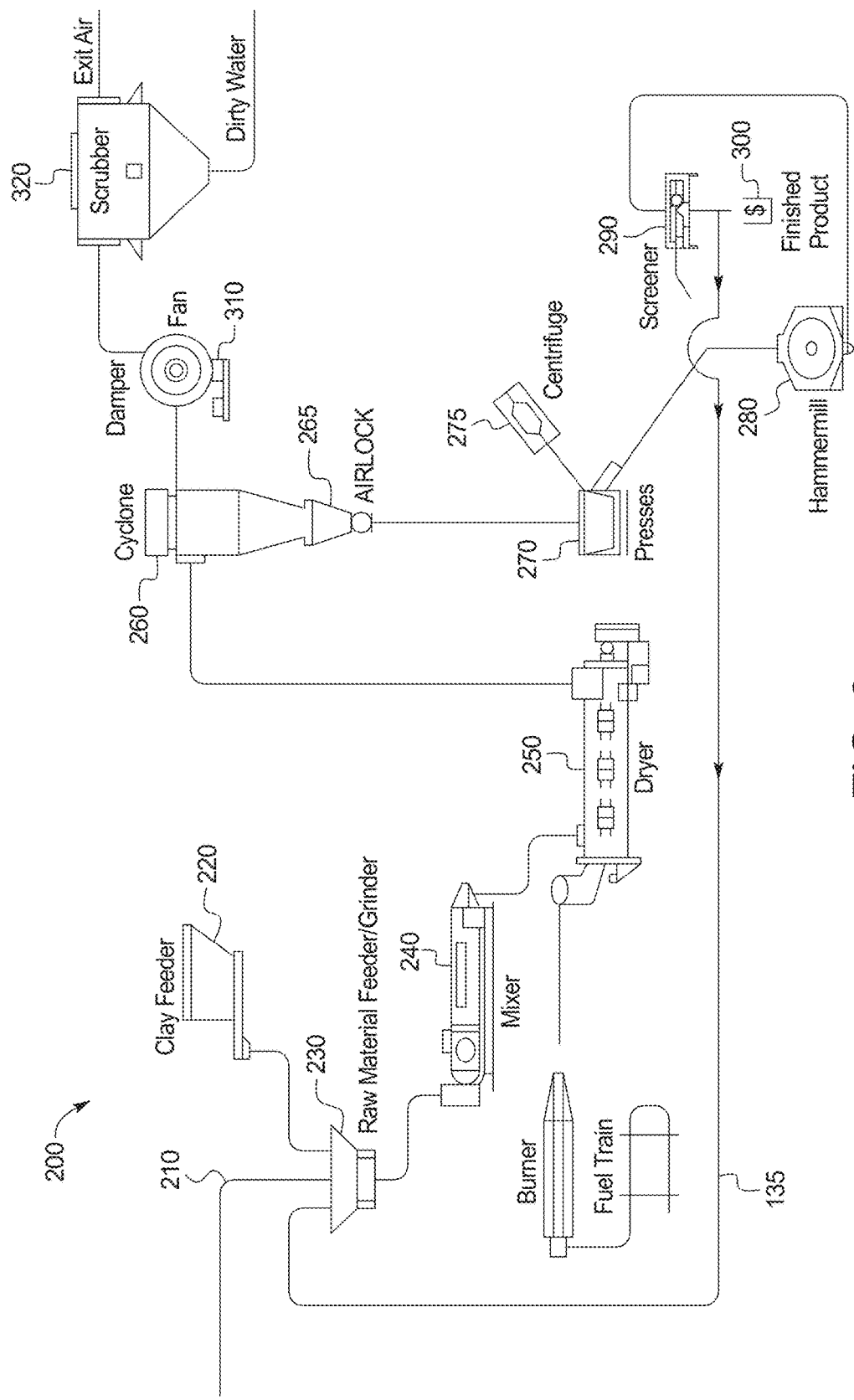
FIG. 2 is an example of the present system for converting fish into fishmeal.

Specifically, FIG. 2 illustrates an apparatus 200 according to one example of the present method. The apparatus 200 includes a raw material grinder 230 for grinding raw material 210. The raw material 210 is preferably an animal byproduct material having an original moisture content of about 50 to about 80 percent, a fat content of approximately 10 to about 50 percent, and a protein content of about 10 to about 50 percent. In one embodiment, the original moisture content of the raw material is approximately 70 percent. In some examples, an oil absorbing material, such as a bentonite clay material, from a clay feeder 220 is mixed with the raw material 210 in the grinder or in a mixer 240. The oil absorbing material is preferably a carrier to help carry the oil. The mixer 240 mixes the ground raw material with the oil absorbing material and a backmix material. In some embodiments, the backmix material is any dried animal byproduct material, such as offal. The ground and mixed materials contain less than 60 percent and greater than about 40 percent moisture prior to drying. In one example, the ground and mixed materials contain approximately 50 percent moisture prior to drying. The mixed materials are then conveyed to a dryer 250 for drying the mixed materials. The dried materials contain about 2 to about 25 percent moisture. In one embodiment, the dried materials contain approximately 10 percent moisture. The dried materials are then sent to a cyclone 260 for separating an air stream from the dried materials. In one embodiment, the cyclone 260 is replaced by a bag house (not shown) for separating an air stream from the dried materials. The air stream is drawn into an optional scrubber 320 by a fan 310. In some embodiments, the optional scrubber 320 is coupled to the apparatus 200 to further remove any odoriferous materials and any off-gasses. The dried materials are transported to one or more presses 270 through an airlock 265. The one or more presses 270 press the dried materials, reducing oil content from the dried materials. The one or more presses 270 include a first opening for delivering pressed oil to a centrifuge 275 and a second opening for transporting the pressed materials to a screener 290 through a hammermill 280. From the screener 290, a portion of the screened material is sent back to the mixer 240. Alternatively, in some embodiments, a portion of the screened material is sent to the grinder 230. The balance of the screened material is sent to storage 300 as finished product or meal.

The present fishmeal composition can include 2-15% water, 5-15% fat, 45-65% protein, 0.1-2% fiber, and 20-30% ash. In an example, the process results in a fishmeal composition including around 28% fish meal and 7% oil in return for every pound of Asian carp used. In an example, the final composition of the Asian carp fishmeal includes a moisture content of 6.2%, a fat content of 11%, proteins 58%, fiber 0.4% and ash of 24%. In an example, the final composition of the Asian carp fishmeal includes a moisture content of 6.9%, a fat content of 10.7%, proteins 57%, fiber 0.7% and ash of 24%. In an example, the final composition of the Asian carp fishmeal includes a moisture content of 5.7%, a fat content of 11.2%, proteins 58.1%, fiber 0.6% and ash of 24.2%. The effective absorption of the fishmeal composition may be 95%. Having the absorption capacity of the raw material makes it possible to adjust the water to cement ratio of the present concrete compositions.

Cement production is responsible for 7% of the total $CO_2$ emitted into the atmosphere annually. Over 10 billion tons of concrete is produced in the world annually, with the United States being responsible for 500 million tons of the annual global production. Research from the EPA indicates that for every kilogram of cement that is produced an equivalent amount of $CO_2$ is released into the atmosphere. For example, a typical roadway project one mile long with just a two-lane road using only concrete would use 2346 yards. Therefore, 150 lbs per cubic yard of concrete would equate to 176 tons of $CO_2$ being released in the atmosphere. By replacing 1% by unit weight with the Asian carp fishmeal is capable of displacing up to 1.76 tons of $CO_2$. The production of cement is also credited for being the largest user of natural resources. Annually, cement production accounts for 1 billion tons of water used, 9 billion tons of aggregate, and over 1.5 billion tons of cement.

Fly ash, for example, is a popular raw material that is used in with the production of concrete. One reason to find an alternative to using fly ash in the production of concrete is that fly ash is essentially a finite resource. Fly ash is a by-product made from coal, which is being mined and used in the production of electricity in coal-fired power plants. Coal is used to produce the energy needed to provide an adequate supply of electricity to meet our daily demand but result in negative by-products from the coal-fired power plants. The present fishmeal composition can help to alleviate this demand, and its use in concrete reduces negative environmental impact.

The present concrete composition includes the fishmeal composition and a cement composition. Typically, the fishmeal composition is present in the concrete composition in a range of 0.1% to 20%, for example, 0.1% to 10%, 0.1% to 5%, 0.5% to 2%, or 0.5% to 1%. In an example, the fishmeal composition can be degreased before use in the cement composition. Conventional degassing methods can be used.

The concrete composition can include any suitable cement. For example, the cement composition can include aggregate including course aggregate, fine aggregate, or a combination thereof. The course aggregate can be course sand, whereas the fine aggregate can include fine sand. In an example, the fine aggregate represents a smaller percent composition than that of the course aggregate in the concrete composition. The aggregate can include any readily available coarse grade of sand, such as mason sand, or an equivalent.

The concrete composition can include a cementitious material including cement and organic material. The cementitious material can include 80% to 100% cement and 0% to 30% organic material. For example, the cementitious material and aggregate material can be mixed with a liquid to form a flowable cement material that can be set into a solid concrete. The cement can include a blast furnace cement, a Portland cement component, or combinations thereof. The particulate blast furnace slag cement may be any commercially available blast furnace slag cement but is preferably a ground iron blast furnace slag cement. A particularly preferred material is Blue Circle® ground iron blast furnace slag cement in grade 120, available from Blue Circle cement, Baltimore, Md. The blast furnace slag cement is preferably finely ground, having a particle size distribution in which at least about 90%, and preferably essentially all, of the cement particles pass through a No. 100 (149 microns) U.S. Standard sieve. The cement can be Portland cement, early-strength Portland cement, low heat-moderate heat Portland cement, blast furnace cement, silica fume cement and VKC-100SF for cements.

The organic matter of the cementitious material can include any suitable organic material. For example, the organic material can include gypsum as a component, and the gypsum is preferably a calcium sulfate α-hemihydrate. The gypsum should be present in an amount of about 20 to about 35%, based on the weight of the concrete composition. The particulate gypsum is preferably finely ground and preferably contains a particle size distribution in which at least about 90%, and preferably essentially all, of the gypsum particles pass through a No. 100 (149 microns) U.S. Standard sieve. A preferred gypsum for use as the gypsum component in the cementitious material is a white gypsum, such as Hydrocal® white gypsum, available from United States Gypsum Company, Chicago, Ill.

The cement composition can include the addition of a plasticizer in a suitable amount. The plasticizer is used in the concrete composition to impart an excellent fluidity to the flowable, liquid coating formulation made from the concrete composition. The plasticizer serves as a dispersing agent, particularly for the cement and gypsum components, thereby providing the desired fluidizing effect. The plasticizer is employed to give homogeneity to the liquid free-flowing, sell-leveling coating formulation made from the concrete composition. The plasticizer provides a liquid coating formulation that is a wet mixture, creamy in nature, with stable suspension properties that result in an excellent pumping characteristics which facilitate application and self-leveling of the applied liquid mix on a substrate such as a floor substrate.

The plasticizer useful in the concrete composition can include melamine sulfonate-formaldehyde condensates, naphthalene sulfonate-formaldehyde condensates, naphthalene sulfonates, calcium lignosulfonates, sodium lignosulfonates, saccharose, sodium gluconate, sulfonic acids, carbohydrates, amino carboxylic acids, polyhydroxy carboxylic acids, sulfonated melamine, and the like.

The amount of plasticizer used in the concrete composition will vary, depending on the fluidizing ability of the particular plasticizer selected. Generally, the amount of plasticizer is preferably in the range of about 0.3 to about 3%, and more preferably about 0.5 to about 2%, based on the weight of the concrete composition.

Preferred plasticizer include Melment® F-10, a melamine-formaldehyde-sodium bisulfite polymer dispersant, available from SW/Chemicals, Inc., Marietta, Ga., that is a fine white powder. Another suitable plasticizer is Lamar® D, a condensed sodium salt of sulfonated naphthalene formaldehyde, available from Henkel Corp., Ambler, Pa.

The concrete composition can also include a polymeric material, such as a vinyl polymer or equivalent, to enhance the following properties provided by the concrete composition when used in coating formulations: binding or adhesion; resilience and flexural strength; and abrasion resistance. The vinyl polymer or its functional equivalent is preferably a cross-linkable polymer.

The powdered vinyl polymer is preferably polyvinyl acetate or a copolymer of vinyl acetate with another monomer, such as ethylene. A preferred vinyl acetate resin is Airflex® RP-224 thermoplastic resin powder, containing a vinyl acetate-ethylene copolymer, available from Air Products and Chemicals, Inc., Allentown, Pa.

The powdered vinyl polymer is an optional but preferred component in the concrete composition, and may be used in amounts of about 0.5 to about 6%, based on the weight of the concrete composition. Preferably, the vinyl polymer is present in an amount of about 1 to about 4%, and more preferably about 2%, based on the weight of the concrete composition.

The cement composition can include copolymerizable monomers, following monomers may also be mentioned. For example, they are (non-)aqueous monomers such as methyl (meth)acrylate, ethyl (meth)acylate, butyl (meth)acrylate and styrene; anionic monomers such as itaconic acid, maleic acid (anhydride), vinyl sulfonic acid, and styrene sulfonic acid; and amide-base monomers such as alkylene oxide adducts of allyl alcohol, acrylamide and an alkylene oxide adduct of acrylamide; and polyalkylene glycol-base monomers such as mono- or di-esters of a polyalkylene glycol and maleic anhydride, and esters of a polyalkylene glycol and itaconic acid.

The concrete composition optionally may in addition contain a defoamer, sometimes called a defoaming agent or antifoaming agent. Defoamers for use in concrete composition products are well known, and such defoamers may be used in the concrete composition of the present invention.

Concrete composition defoamers can include, without limitation, tributyl phosphate, silicones, borate esters, petroleum derivatives (including hydrocarbon emulsions), nonylphenol, polyoxyethylene alkyl phenol, butyl stearate, butyl phthalate, fat alcohols and light alcohols. A preferred defoamer is Foamaster® PD#1 powder, available from Henkel Corporation; Ambler, Pa.; this defoamer is believed to be a petroleum derivative.

The concrete composition can also include silica fume, fly ash, a calcium carbonate powder, a blast furnace slag powder, expanding agent, water, and combinations thereof.

The cement composition can include a setting retarder, such as, inorganic setting retarders such as phosphates, silicon fluoride compounds, zinc oxide, zinc carbonate, zinc chloride, zinc monoxide, copper hydroxide, magnesium salts, borax, and boron oxide; and/or organic setting retarders such as phosphonic acid derivatives, sugar and its derivatives, hydroxycarboxylates and lignin sulfonates. When the setting retarders are more particularly described, there may be mentioned phosphonic acid derivatives such as aminotri(methylene phosphonic acid), aminotri(methylene phosphonic acid)pentasodium salt, 1-hydroxyethylidene-1,1-diphosphonic acid, ethylenediaminetetra(methylene phosphonic acid), diethylenetriaminepenta(methylene phosphonic acid), and phosphonates of an alkali metal and an alkali earth metal and the derivatives thereof; sugars such as saccharose, maltose, raffinose, lactose, glucose, fructose, mannose, arabinose, xylose, abitose and ribose; and hydroxycarboxylates such as gluconic acid, citric acid, glucoheptonic acid, malic acid and tartaric acid, and alkali metal salts and alkali earth metal salts thereof.

The concrete composition can also include an accelerator inorganic accelerators such as calcium chloride, and calcium nitrite and organic accelerators such as alkanolamines. In addition, the concrete composition can include a thickening agent and/or separation inhibitor, which can include cellulose base water-soluble polymers such as cellulose ethers (MC and the like), polyacrylamide-basewater-soluble polymers such as polyacrylamides, biopolymers such as curdlan and welan gum; and/or non-ionic thickening agents such as fatty acid diesters of a polyalkylene glycol, and urethane condensates of a polyalkylene glycol.

The amount of water that is added to the concrete composition and coarse sand or other aggregate is an amount that provides a liquid mixture that is relatively flowable or free-flowing, and provides the desired self-leveling and self-smoothing characteristics in the coating formulation. The amount of water added may be from about 12 to about 23% based on the total weight of the liquid mixture (including concrete composition, aggregate and water). An amount of water from about 15 to about 19% based on the total weight of the liquid mixture is more preferred, with about 17% water being most preferred. Conventional equipment for mixing and pumping flowable concrete composition can be used.

The fishmeal composition can be added to the flowable cement composition to for the concrete composition. The fishmeal composition can be added in any suitable method and mixed using conventional mixers. The flowable concrete mixtures can be shaped and subsequently dried using conventional techniques.

EXAMPLES

For the examples, the fishmeal was treated as a cementitious material. The examples were designed to yield two cubic feet of concrete. The first example had a water to cement ratio of 0.4, and ten percent of the cement by weight was replaced with fishmeal. The second example had a water to cement ratio of 0.5, and ten percent of the cement by weight was replaced with fishmeal. Three liters of superplasticizer was added to each mix during mixing to increase the workability of the mix. The cement used was Lafarge Portland Cement Type 1.

The cylinders were formed by mixing cement, fishmeal, fine aggregate (e.g., sand), course aggregate, and water. Plasticizer was added during mixing when used. The cylinders were not baked after mixing. Instead, each cylinder and beam were left to set for 24 hours with a wet rag covering each test specimen. All mixing and resting was performed at room temperature. After the cylinders are set for 24 hours, the cylinders are removed from the casting and sat in a humidty chamber for the remaining duration before testing. The humidity chamber provides a constant mist on the test cylinders until the test cylinders are ready to be tested at their appropriate and defined time.

For the examples, the fishmeal was used in the amounts of: 0.5, 1, 2, 5, 10 and 12 percent by weight. The water to cement ratios of some of the mixes were also adjusted to account for the absorption capacity of the fishmeal. In each example, the water to cement ratio was maintainined at 1:1. Finally, the natural oils in the fish were taken into account by adding a degreasing agent in the 5% mix. The degassing agent was DAWN.

For the compression test, a hydraulic press was used to press each cylinder. Each cylinder was loaded with enough force to ensure a failure in the cylinders. The amount of force needed to break the cylinder varied and is described in the results. ASTM C873/C873M-15/039/039M-17b was used.

Example 1: 0.5%

TABLE 2

Mix Design .5%

| Material | Type | Weight (lbs./ft$^3$) | Condition |
|---|---|---|---|
| Aggregate | Course Aggregate | 67.5185 | SSD |
|  | Fine Aggregate | 48.1481 | 2.90% Moisture |
| Cementitious | Cement | 22.22 | Dry |
| Material | Organic Matter | 0 | SSD |
| Filler | Organic Matter | 0.185 | SSD |
|  | Water | 0.185 | Wet |
| Liquid | Water | 9.852 | Wet |
|  | Add-Mixture | 0 |  |
| Yield: 1 cubic feet |  |  | W/C ratio: .50 |

The coarse aggregate is manufactured from Hanson Material Service Thornton Quarry, wherein the fine aggregates came from Hanson Material Service in Romeoville. The testing specimen were designed to maintain a density of 150 lbs/2 cubic feet. The organic matter is the fishmeal. The liquid used was water and held at 50% water to cement ratio. The add-mixture is the fishmeal and organic matter.

The amount of course aggregates used was determined using a testing batch weight of 150 lbs/2 cubic feet with a 0% moisture replacement added with a with a specific gravity of 2.70. The amount of fine aggregates used was determined using a testing batch weight of 150 lbs/2 cubic feet with a 4% moisture replacement added with a with a specific gravity of 2.67.

SSD stands for saturated surface dry which is a condition of the aggregate in which the surface of the aggregate appears dry, but the inside is holding moisture which was accounted for in the mix designs.

The fishmeal in the examples was prepared according to the process depicted in FIG. 2 and explained previously herein.

Example 2: 1%

TABLE 3

Mix Design 1%

| Material | Type | Weight (lbs./ft$^3$) | Condition |
|---|---|---|---|
| Aggregate | Course Aggregate | 67.5185 | SSD |
|  | Fine Aggregate | 47.4815 | 2.90% Moisture |
| Cementitious | Cement | 22.037 | Dry |
| Material | Organic Matter | 0 | SSD |
| Filler | Organic Matter | 0.37 | SSD |
|  | Water | 0.37 | Wet |
| Liquid | Water | 9.8893 | Wet |
|  | Add-Mixture | 0 |  |
| Yield: 1 cubic feet |  |  | W/C ratio: .50 |

Example 3: 2%

TABLE 4

Mix Design 2%

| Material | Type | Weight (lbs./ft³) | Condition |
|---|---|---|---|
| Aggregate | Course Aggregate | 67.5185 | SSD |
|  | Fine Aggregate | 46.7778 | 2.90% Moisture |
| Cementitious Material | Cement | 21.8519 | Dry |
|  | Organic Matter | 0 | SSD |
| Filler | Organic Matter | 0.555 | SSD |
|  | Water | 0.555 | Wet |
| Liquid | Water | 9.889 | Wet |
|  | Add-Mixture | 0 |  |
| Yield: 1 cubic feet |  |  | W/C ratio: .50 |

Example 4: 5%

TABLE 5

Mix Design 5%

| Material | Type | Weight (lbs./ft³) | Condition |
|---|---|---|---|
| Aggregate | Course Aggregate | 67.5185 | SSD |
|  | Fine Aggregate | 45.222 | 2.90% moisture |
| Cementitious Material | Cement | 21.111 | Dry |
|  | Organic Matter | 0 | SSD |
| Filler | Organic Matter | 1.111 | SSD |
|  | Water | 1.111 | Wet |
| Liquid | Water | 9.852 | Wet |
|  | Add-Mixture | 25 mL |  |
| Yield: 1 cubic feet |  |  | W/C ratio: .50 |

Example 5: 5% Degreased

TABLE 6

Mix Design 5% (Degreased)

| Material | Type | Weight (lbs./ft³) | Condition |
|---|---|---|---|
| Aggregate | Course Aggregate | 67.5185 | SSD |
|  | Fine Aggregate | 45.222 | 2.90% moisture |
| Cementitious Material | Cement | 21.111 | Dry |
|  | Organic Matter | 0 | SSD |
| Filler | Organic Matter | 0.9 | SSD |
|  | Water | 1.111 | Wet |
| Liquid | Water | 9.852 | Wet |
|  | Add-Mixture | 0 |  |
| Yield: 1 cubic feet |  |  | W/C ratio: .50 |

Example 6: 10%

TABLE 7

Mix Design 10%

| Material | Type | Weight (lbs./ft³) | Condition |
|---|---|---|---|
| Aggregate | Course Aggregate | 67.5185 | SSD |
|  | Fine Aggregate | 40.963 | 2.90% moisture |
| Cementitious | Cement | 20 | Dry |

TABLE 7-continued

Mix Design 10%

| Material | Type | Weight (lbs./ft³) | Condition |
|---|---|---|---|
| Material | Organic Matter | 0 | SSD |
| Filler | Organic Matter | 2.22 | SSD |
|  | Water | 2.22 | Wet |
| Liquid | Water | 9.9652 | Wet |
|  | Add-Mixture | 30 mL |  |

TABLE 8

Mix Design 12%

| Material | Type | Weight (lbs./ft³) | Condition |
|---|---|---|---|
| Aggregate | Course Aggregate | 67.5185 | SSD |
|  | Fine Aggregate | 38.3704 | 2.90% moisture |
| Cementitious Material | Cement | 19.6296 | Dry |
|  | Organic Matter | 0 | SSD |
| Filler | Organic Matter | 2.7778 | SSD |
|  | Water | 2.7778 | Wet |
| Liquid | Water | 10.1481 | Wet |
|  | Add-Mixture | 90 mL |  |
| Yield: 1 cubic feet |  |  | W/C ratio: .50 |

Compressive tests were performed on the examples. The results of the compression tests are summarized in the tables below. The compositions of Examples 1-7 were each formed into two separate cylinders for double testing, the average of which form the results of Table Cylinders 1 and 2 compressive test results are in Tables 9-10, wherein the average of the results from cylinders 1 and 2 are shown in Table 11.

TABLE 9

Cylinder 1 Compressive Test Result

|  | 3 Day (psi) | 7 Day (psi) | 14 Day (psi) | 28 Day (psi) |
|---|---|---|---|---|
| 0.5% | 2840 | 3640 | 4460 | 4280 |
| 1% | 2570 | 3280 | 3760 | 4050 |
| 2% | 2480 | 3140 | 3820 | 4090 |
| 5% | 2440 | 3230 | 4210 | 4690 |
| 10% | 141.4 | 854 | 1705 | 2310 |
| 12% | No Test | 28.4 | 264 | 1777 |
| 5% (Dawn Treated) | 1415 | 1811 | 2430 | 2770 |

TABLE 10

Cylinder 2 Compressive Test Result

|  | 3 Day (psi) | 7 Day (psi) | 14 Day (psi) | 28 Day (psi) |
|---|---|---|---|---|
| 0.5% | 3360 | 3850 | 4550 | 4210 |
| 1% | 2700 | 3270 | 4130 | 3610 |
| 2% | 2510 | 3160 | 3900 | 4060 |
| 5% | 2460 | 2940 | 4070 | 3450 |
| 10% | No Test | No Test | No Test | 2150 |
| 12% | No Test | No Test | No Test | 1814 |
| 5% (Dawn Treated) | 1429 | 2070 | 2530 | 3070 |

TABLE 11

Average Compressive Test

|  | 3 Day (psi) | 7 Day (psi) | 14 Day (psi) | 28 Day (psi) |
|---|---|---|---|---|
| Control | 4890 | 5720 | 5956 | 6410 |
| 0.5% | 3100 | 3745 | 4505 | 4245 |
| 1% | 2635 | 3275 | 3945 | 3830 |
| 2% | 2495 | 3150 | 3860 | 4075 |
| 5% | 2450 | 3085 | 4140 | 4070 |
| 5% (Dawn Treated) | 1422 | 1940.5 | 2480 | 2920 |
| 10% | 141.4 | 854 | 1705 | 2230 |
| 12% | 0 | 28.4 | 264 | 1796 |

Figure 3A:
FIGS. 3A-3D are photos of the 0.5% fishmeal composition at various times.
Figure 3B:
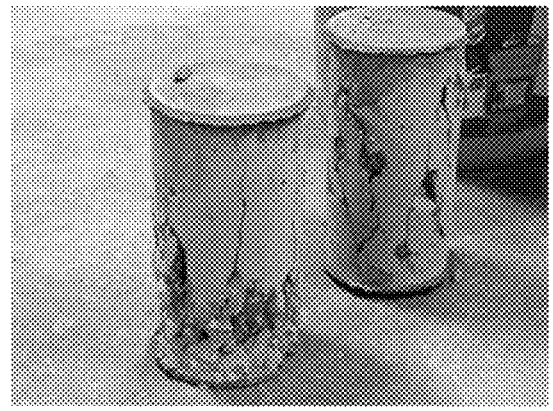
Figure 3C:
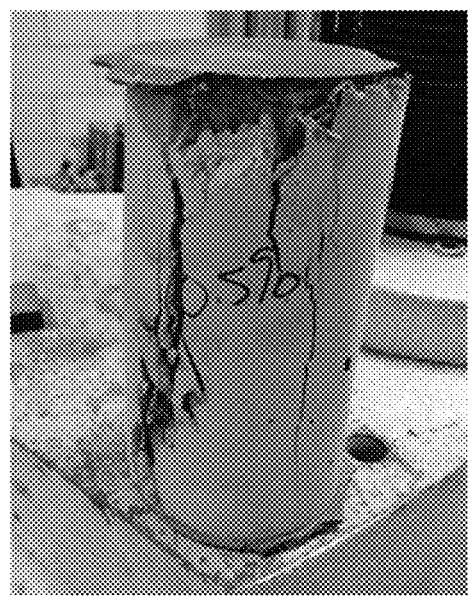
Figure 3D:

FIGS. 3A-3D correspond to photos of the cylinder including 0.5% fishmeal, wherein FIG. 3A corresponds to the cylinder at 3 days and has a failure mode of cone and shear, FIG. 3B corresponds to the cylinder at 7 days and has a failure mode of column and shear, FIG. 3C corresponds to the cylinder at 14 days and has a failure mode of column, and FIG. 3D corresponds to the cylinder at 28 days and has a failure mode of column.

Figure 10:
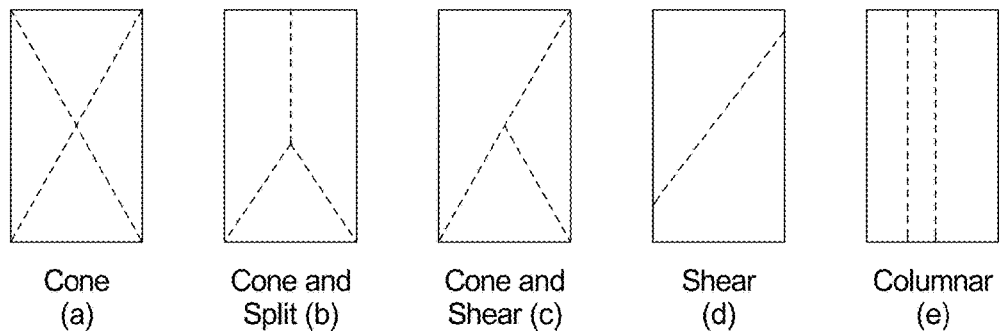
FIG. 10 is a diagram defining the compression results.

The compression result terms are defined in FIG. 10.

Figure 4A:
FIGS. 4A-4D are photos of the 1.0% fishmeal composition at various times.
Figure 4B:
Figure 4C:
Figure 4D:
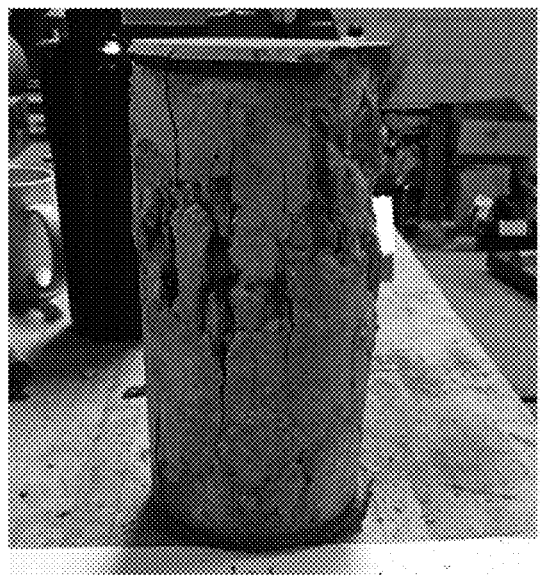

FIGS. 4A-4D correspond to photos of the cylinder including 1.0% fishmeal, wherein FIG. 4A corresponds to the cylinder at 3 days and has a failure mode of shear, FIG. 4B corresponds to the cylinder at 7 days and has a failure mode of cone, FIG. 4C corresponds to the cylinder at 14 days and has a failure mode of cone, and FIG. 4D corresponds to the cylinder at 28 days and has a failure mode of column.

Figure 5A:
FIGS. 5A-5D are photos of the 2.0% fishmeal composition at various time.
Figure 5B:
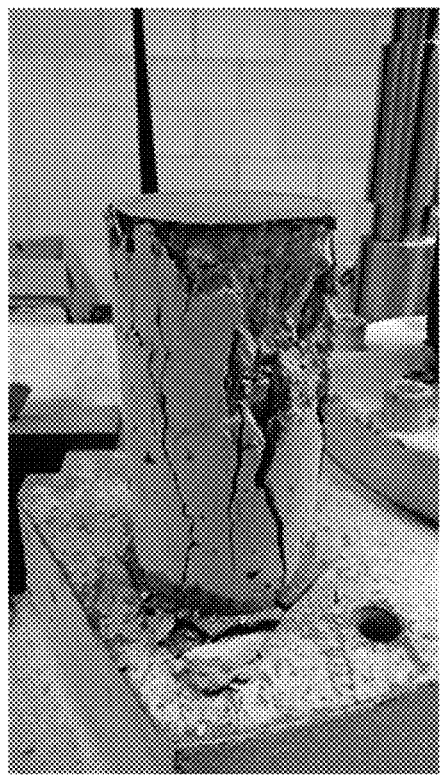
Figure 5C:
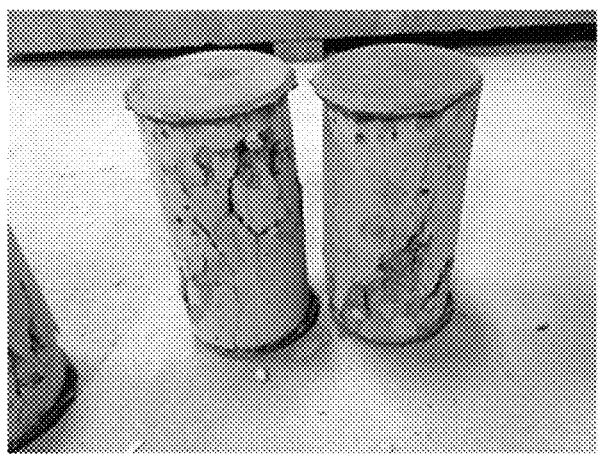
Figure 5D:
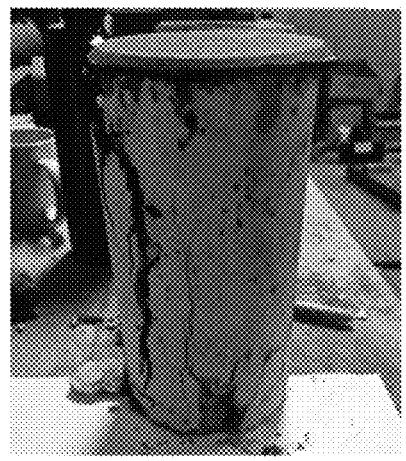

FIGS. 5A-5D correspond to photos of the cylinder including 2.0% fishmeal, wherein FIG. 5A corresponds to the cylinder at 3 days and has a failure mode of cone split, FIG. 5B corresponds to the cylinder at 7 days and has a failure mode of shear, FIG. 5C corresponds to the cylinder at 14 days and has a failure mode of cone, and FIG. 5D corresponds to the cylinder at 28 days and has a failure mode of column.

Figure 6A:
FIGS. 6A-6D are photos of the 5.0% fishmeal composition at various time.
Figure 6B:
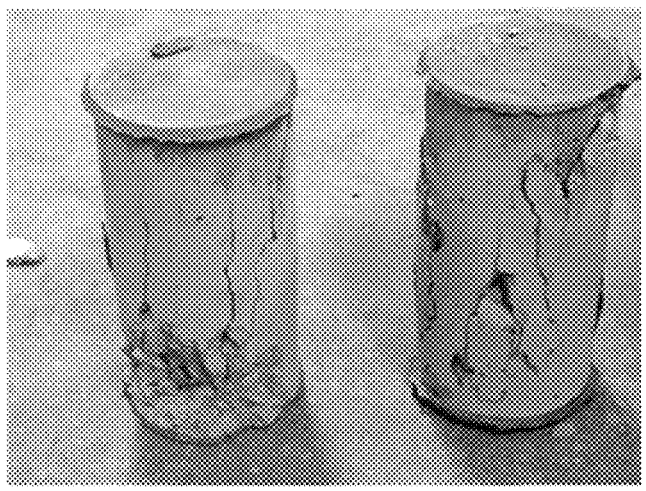
Figure 6C:
Figure 6D:

FIGS. 6A-6D correspond to photos of the cylinder including 5.0% fishmeal, wherein FIG. 6A corresponds to the cylinder at 3 days and has a failure mode of cone and shear, FIG. 6B corresponds to the cylinder at 7 days and has a failure mode of shear, FIG. 6C corresponds to the cylinder at 14 days and has a failure mode of cone and shear, and FIG. 6D corresponds to the cylinder at 28 days and has a failure mode of column.

Figure 7A:
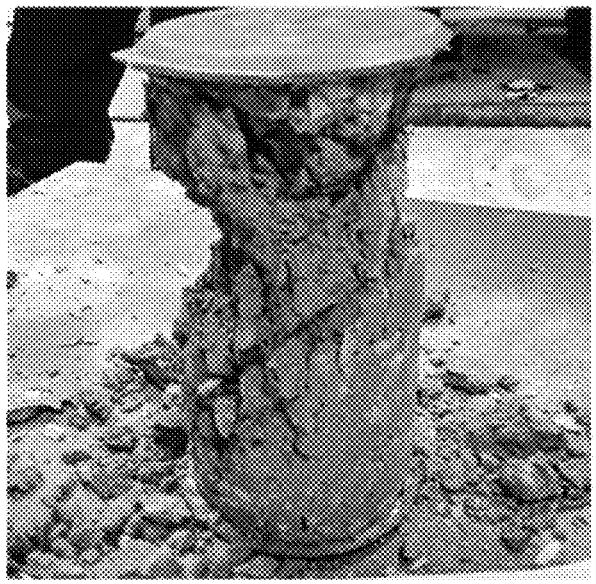
FIGS. 7A-7C are photos of the 10.0% fishmeal composition at various time.
Figure 7B:
Figure 7C:
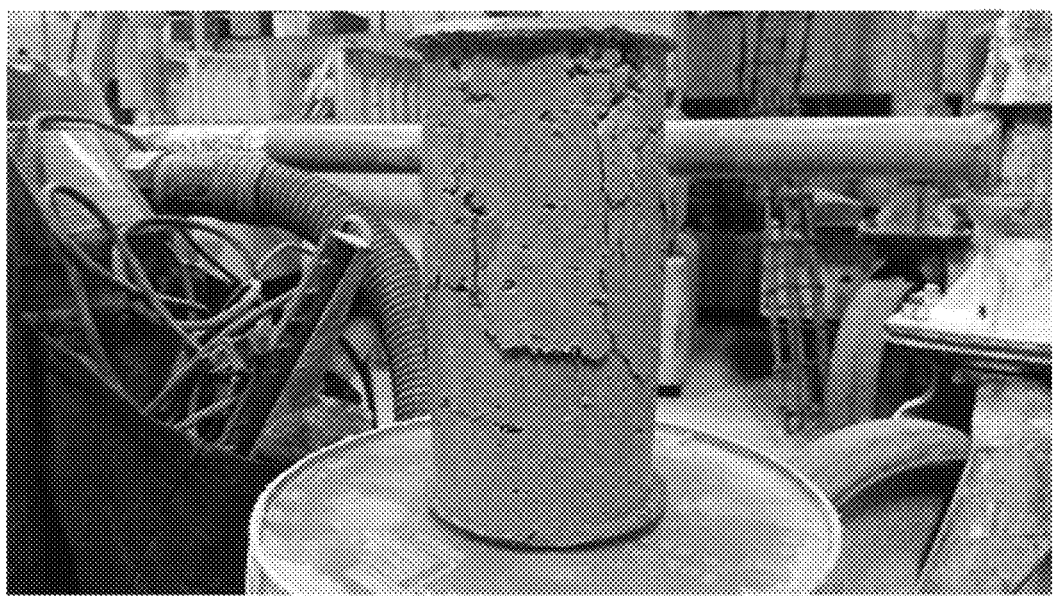

FIGS. 7A-7C correspond to photos of the cylinder including 10.0% fishmeal, wherein FIG. 7A corresponds to the cylinder at 3 days and has a failure mode of cone, FIG. 7B corresponds to the cylinder at 7 days and has a failure mode of cone, FIG. 7C corresponds to the cylinder at 28 days and has a failure mode of cone.

Figure 8A:
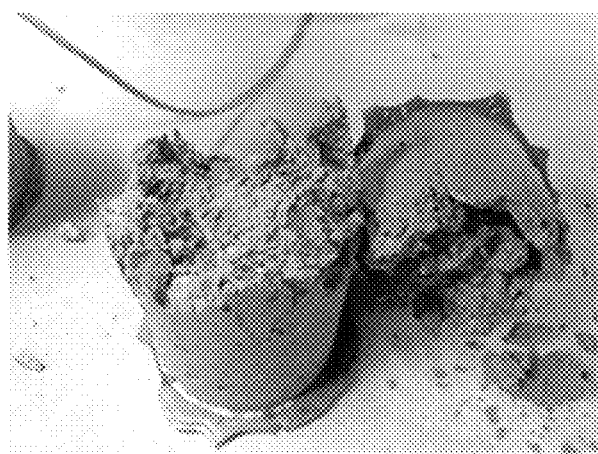
FIGS. 8A-8C are photos of the 12.0% fishmeal composition at various times.
Figure 8B:
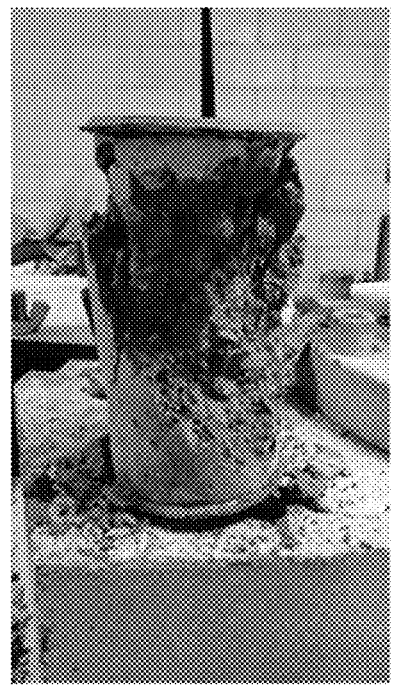
Figure 8C:
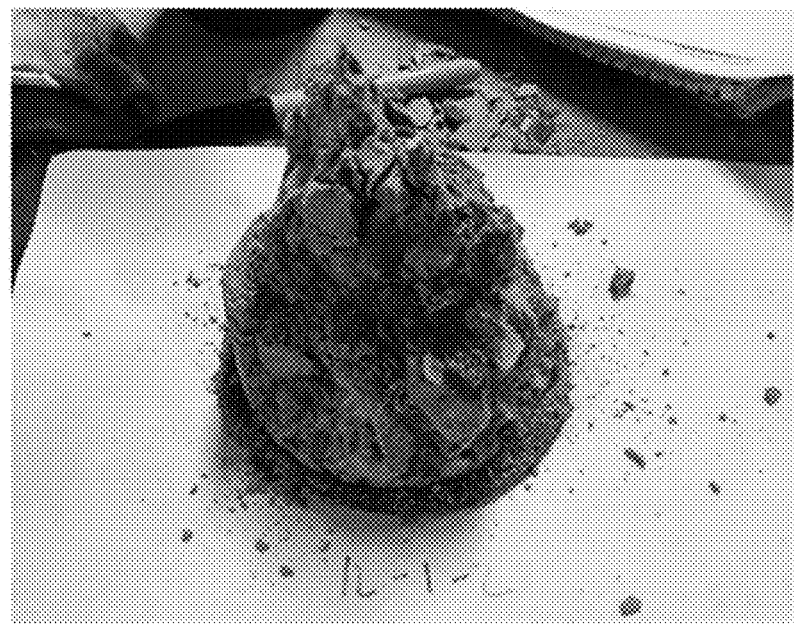

FIGS. 8A-8C correspond to photos of the cylinder including 12.0% fishmeal, wherein FIG. 8A corresponds to the cylinder at 7 days and has a failure mode of cone, FIG. 8B corresponds to the cylinder at 14 days and has a failure mode of cone, and FIG. 8C corresponds to the cylinder at 28 days and has a failure mode of cone.

Figure 9A:
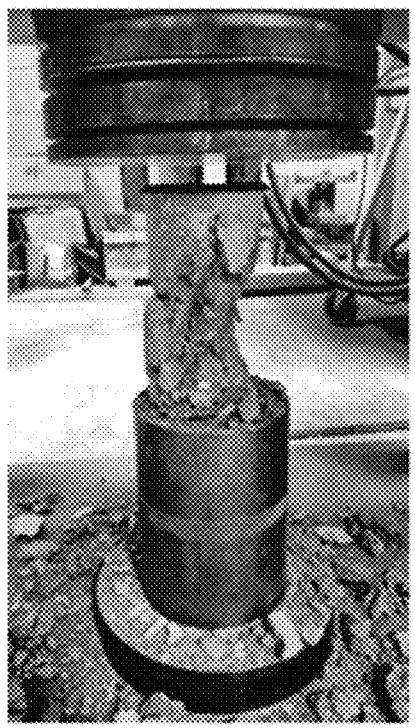
FIGS. 9A-9D are photos of the 5.0% degreased fishmeal composition at various times.
Figure 9B:
Figure 9C:
Figure 9D:

FIGS. 9A-9D correspond to photos of the cylinder including 5.0% degreased fishmeal, wherein FIG. 9A corresponds to the cylinder at 3 days and has a failure mode of cone, FIG. 9B corresponds to the cylinder at 7 days and has a failure mode of cone, FIG. 9C corresponds to the cylinder at 14 days and has a failure mode of split cone, and FIG. 9D corresponds to the cylinder at 28 days and has a failure mode of cone.

The tensile strength of each example was tested using ASTM C78/C78M-16 on beams and ASTM C496/C496M-11 on cylinders.

TABLE 12

Tensile Test Result

|  | Ultimate Load (lb) | Area (in$^2$) | Tensile Strength (psi) |
|---|---|---|---|
| 0.50% | 56416 | 226.188 | 498.84 |
| 1% | 47804 | 226.188 | 422.69 |
| 2% | 43293 | 226.188 | 382.81 |
| 5% | 41589 | 226.188 | 367.74 |
| 5% Degreased | 34663 | 226.188 | 306.50 |
| 10% | 21899 | 226.188 | 193.64 |
| 12% | 16386 | 226.188 | 144.89 |

Figure 11:
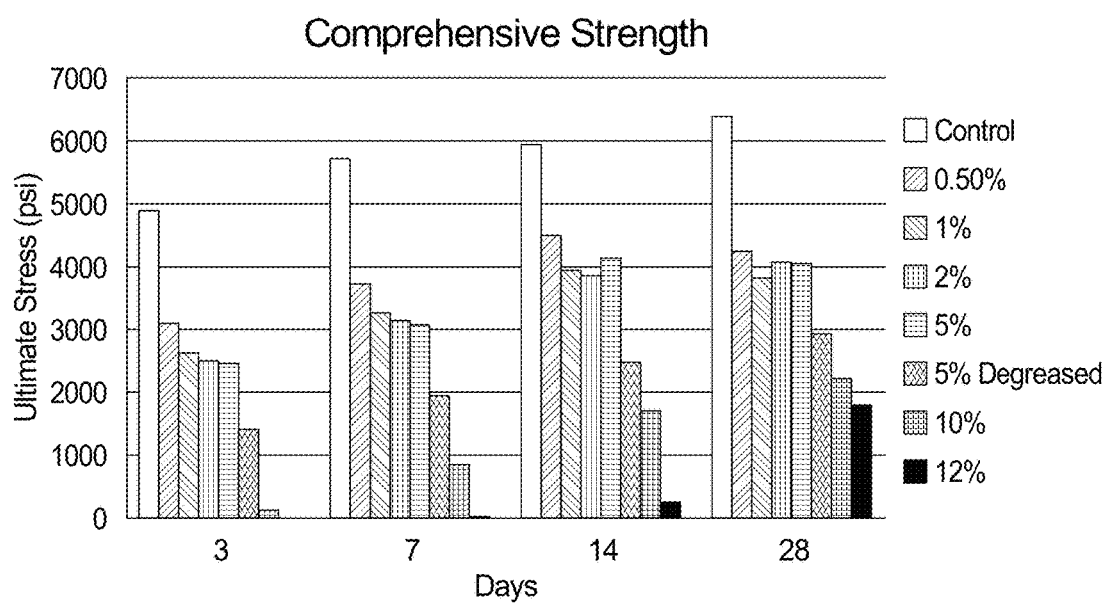
FIG. 11 is a bar graph of the compression results.

One of the greatest factor in improving the compression results appears to be decreasing the amount of fishmeal in the mix. Notably, the strength results held constant in the 3800-4500 psi range despite the fact the range of fishmeal added was only between 0.5 and 5 percent. Interestingly, the degreased sample did not have the anticipated effect of nullifying the hydration impediment; in fact, it drastically reduced the strength of the concrete. Such result most likely has to do with the chemical effects the degreasing agent had on the concrete constituent materials. The compression results can be found in FIG. 11.

As shown in FIG. 12, the present compositions can be used in a variety of applications, without the use of a catalyst to promote a more defined protein chain.

Figure 13:
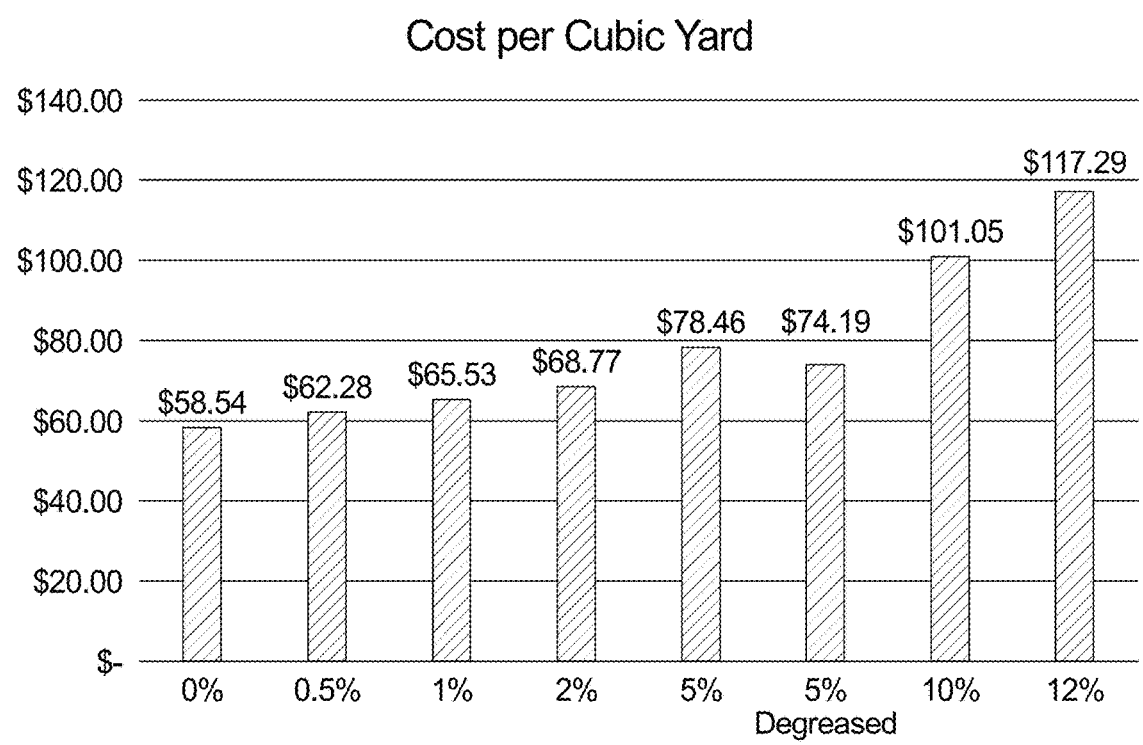
FIG. 13 is a bar graph of the cost analysis of the compositions.

At around $0.75-$1.00, conventional fishmeal is not very competitively priced for the admixture market. This is attributed to a lack of industry competition as well as a lack of production volume. These factors are due to the currently sparse uses of fishmeal in any type of application. The present composition and method increases the volume of fishmeal produced that would conceivably drive down the unit price for retail and wholesale markets. Despite the relatively high cost, the cost of fishmeal per cubic yard as an admixture was based on the relative percentage of fishmeal in the mixture. The cost analysis can be found in FIG. 13.

The following tables include the specific cost analysis of each example.

TABLE 16

Cost Mix Design 0%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 48.1481 | 0.64999935 | $ 28.00 | $18.20 |
| Cementitious Material | Cement | 22.22 | 0.29997 | $ 98.00 | $29.40 |
| Filler | Organic Matter | 0 | 0 | $1,500.00 | $ 0.0 |
| Admixture | Add-Mixture | 0 | 0 | $15.00/gal | $ 0.0 |
|  |  |  |  | Cost Per Cubic Yard | $58.54 |

TABLE 17

Cost Mix Design .5%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 48.1481 | 0.64999935 | $ 28.00 | $18.20 |
| Cementitious Material | Cement | 22.22 | 0.29997 | $ 98.00 | $29.40 |
| Filler | Organic Matter | 0.185 | 0.0024975 | $1,500.00 | $ 3.75 |
| Admixture | Add-Mixture | 0 | 0 | $15.00/gal | $ 0.0 |
|  |  |  |  | Cost Per Cubic Yard | $62.28 |

TABLE 18

Cost Mix Design 1%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 47.4815 | 0.64100025 | $ 28.00 | $17.95 |
| Cementitious Material | Cement | 22.037 | 0.2974995 | $ 98.00 | $29.15 |
| Filler | Organic Matter | 0.37 | 0.004995 | $1,500.00 | $ 7.49 |
| Admixture | Add-Mixture | 0 | 0 | $15.00/gal | $ 0.0 |
|  |  |  |  | Cost Per Cubic Yard | $65.53 |

TABLE 19

Cost Mix Design 2%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 46.7778 | 0.6315003 | $ 28.00 | $17.68 |
| Cementitious Material | Cement | 21.8519 | 0.29500065 | $ 98.00 | $28.91 |
| Filler | Organic Matter | 0.555 | 0.0074925 | $1,500.00 | $11.24 |
| Admixture | Add-Mixture | 0 | 0 | $15.00/gal | $ 0.0 |
|  |  |  |  | Cost Per Cubic Yard | $68.77 |

TABLE 20

Cost Mix Design 5%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 48.1481 | 0.64999935 | $ 28.00 | $18.20 |
| Cementitious Material | Cement | 22.22 | 0.29997 | $ 98.00 | $29.40 |
| Filler | Organic Matter | 0.185 | 0.0024975 | $1,500.00 | $ 3.75 |

TABLE 20-continued

Cost Mix Design 5%

| Material | Type | Weight (lbs/ft3) | Tons per cubic yard | Price Per Ton | Actual Cost |
|---|---|---|---|---|---|
| Admixture | Add-Mixture | 25(ml) | 0.1783161 (gal/yd³) | $15.00/gal | $ 2.67 |
|  |  |  |  | Cost Per Cubic Yard | $78.46 |

TABLE 21

Cost Mix Design 5% Degreased

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $10.94 |
|  | Fine Aggregate | 45.222 | 0.610497 | $ 28.00 | $17.09 |
| Cementitious Material | Cement | 21.111 | 0.2849985 | $ 98.00 | $27.93 |
| Filler | Organic Matter | 0.9 | 0.01215 | $1,500.00 | $18.23 |
| Admixture | Add-Mixture | 0 | 0 | $15.00/gal | $ 0.0 |
|  |  |  |  | Cost Per Cubic Yard | $74.19 |

TABLE 22

Cost Mix Design 10%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $ 10.94 |
|  | Fine Aggregate | 40.963 | 0.5530005 | $ 28.00 | $ 15.48 |
| Cementitious Material | Cement | 20 | 0.27 | $ 98.00 | $ 26.46 |
| Filler | Organic Matter | 2.22 | 0.02997 | $1,500.00 | $ 44.96 |
| Admixture | Add-Mixture | 30(ml) | 0.21397932 (gal/yd³) | $15.00/Gal | $ 3.21 |
|  |  |  |  | Cost Per Cubic Yard | $101.05 |

TABLE 23

Cost Mix Design 12%

| Material | Type | Weight (lbs/ft3) | Tons per cubic yard | Price Per Ton | Actual Cost |
|---|---|---|---|---|---|
| Aggregate | Course Aggregate | 67.5185 | 0.91149975 | $ 12.00 | $ 10.94 |
|  | Fine Aggregate | 38.3704 | 0.5180004 | $ 28.00 | $ 14.50 |
| Cementitious Material | Cement | 19.6296 | 0.2649996 | $ 98.00 | $ 25.97 |
| Filler | Organic Matter | 2.7778 | 0.0375003 | $1,500.00 | $ 56.25 |
| Admixture | Add-Mixture | 90(ml) | 0.64193796 (gal/yd³) | $15.00/Gal | $ 9.63 |
|  |  |  |  | Cost Per Cubic Yard | $117.29 |

TABLE 24

Cost Per Cubic Yard

| | Cost per Cubic Yard |
|---|---|
| 0% | $ 58.54 |
| 0.5 | $ 62.28 |
| 1% | $ 65.53 |
| 2% | $ 68.77 |
| 5% | $ 78.46 |
| 5% Degreased | $ 74.19 |
| 10% | $101.05 |
| 12% | $117.29 |

The present composition and methods result in a production of fishmeal that is much cleaner environmentally, and requires fewer industry regulations when compared to coal by-product admixtures like slag and fly ash. The large environmental benefit would come in the form of reduced Asian Carp in the Mississippi River Basin waterways. A reduction in the carp would help multiple economies which suffer due to the carp.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A method of making a concrete composition, the method comprising:
grinding a fish product;
mixing the ground fish products with an oil absorbing material to form a mixed material;
drying the mixed material in a dryer to form a dried material;
separating the dried material in a cyclone including an airstream to form a separated dried material;
pressing the separated dried material to form a fishmeal composition;
forming a cement composition including cement, at least one aggregate, a filler, and water; and
mixing the fishmeal composition and cement composition to form a concrete composition.

2. The method of claim 1, wherein the concrete composition includes 0.1% to 5% of the fishmeal composition.

3. The method of claim 1, wherein the concrete composition includes 0.1% to 3% of the fishmeal composition.

4. The method of claim 1, wherein the concreate composition includes 0.1% to 1% of the fishmeal composition.

5. The method of claim 1, wherein the fishmeal composition includes 2-15% water, 5-15% fat, 45-65% protein, 0.1-2% fiber, and 20-30% ash.

6. The method of claim 1, wherein the fishmeal composition is derived from Asian carp fish.

7. The method of claim 1, wherein the cement includes Portland cement.

8. The method of claim 1, wherein the aggregate includes sand.

9. The method of claim 1, wherein the cement composition includes a plasticizer.

\* \* \* \* \*